US007915992B2

(12) United States Patent
de Rooij et al.

(10) Patent No.: US 7,915,992 B2
(45) Date of Patent: Mar. 29, 2011

(54) PLANAR, HIGH VOLTAGE EMBEDDED TRANSFORMER FOR ANALOG AND DIGITAL DATA TRANSMISSION

(75) Inventors: Michael Andrew de Rooij, Sparks, NV (US); William Hullinger Huber, Scotia, NY (US); William Edward Burdick, Jr., Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/491,337

(22) Filed: Jun. 25, 2009

(65) Prior Publication Data

US 2010/0328012 A1 Dec. 30, 2010

(51) Int. Cl.
*H01F 5/00* (2006.01)
*G01V 3/00* (2006.01)

(52) U.S. Cl. .......................... 336/200; 324/300; 333/25

(58) Field of Classification Search .................. 336/200, 336/223, 232; 324/300, 307, 318, 322; 333/24 R, 333/25
See application file for complete search history.

(56) References Cited

U.S. PATENT DOCUMENTS

| | | | | |
|---|---|---|---|---|
| 6,591,128 | B1 * | 7/2003 | Wu et al. | 600/422 |
| 6,724,642 | B2 | 4/2004 | Brkovic | |
| 7,221,251 | B2 | 5/2007 | Menegoli et al. | |
| 7,239,144 | B2 | 7/2007 | Oppelt et al. | |
| 7,378,851 | B1 * | 5/2008 | de Rooij et al. | 324/322 |
| 7,382,125 | B2 * | 6/2008 | Fisher et al. | 324/307 |
| 7,443,163 | B2 | 10/2008 | Warntjes et al. | |
| 2005/0156699 | A1 * | 7/2005 | Hui et al. | 336/200 |
| 2005/0270031 | A1 | 12/2005 | Oppelt et al. | |
| 2008/0122439 | A1 | 5/2008 | Burdick et al. | |
| 2008/0174397 | A1 | 7/2008 | de Rooij et al. | |
| 2008/0258837 | A1 * | 10/2008 | Liu et al. | 333/25 |

OTHER PUBLICATIONS

R. Oppelt, M. Vester, A Low Input Impedance MRI Preamplifier Using a Purely Capacitive Feedback Network, Corporate Technologh, Siemens AG, Erlangen, Germany, Medical Solutions, Siemens AG, Erlangen, Germany, Proc. Intl. Soc. Mag. Reson. Med. 14, p. 2026 (2006).

Carl Blake, Dan Kinzer, Peter Wood, Synchronous Rectifiers versus Schottky Diodes: A Comparison of the Losses of a Synchronos Rectifier Versus the Losses of a Schottky Diode Rectifier, Applied Power Electronics Conference and Exposition, 1994. APEC '94. Conference Proceedings 1994., Ninth Annual , pp. 17-23 vol. 1.

Ms. Yu Candy, High Isolation Power Supply, Post Date: Dec. 20, 2008, Expiry date: Dec. 20, 2009.

J. T. Strydom, M.A. De Rooij, J.D. Van Wyk, A Comparison of Fundamental Gate-Driver Topologies for High Frequency Applications, IEEE Proceedings of the 19th Applied Power Electronics Conference and Exposition (APEC), vol. 2, 2004, pp. 10045-10052.

(Continued)

*Primary Examiner* — Anh T Mai
(74) *Attorney, Agent, or Firm* — Jason K. Klindtworth

(57) ABSTRACT

A transformer includes a flex or printed circuit board consisting of a substrate material having a desired permittivity, and at least one primary winding and at least one secondary winding. Each winding is integrated with the flex or printed circuit board such that one or more respective transformer parasitic elements and the substrate permittivity between the primary and secondary windings together are tuned to a desired parallel resonant frequency.

20 Claims, 13 Drawing Sheets

OTHER PUBLICATIONS

M.A. De Rooij, J.T. Strydom, J.D. Van Wyk, P. Beamer, Design Considerations for a 1MHz MOSFET Gate-driver for Integrated Converters, Proceedings of the Center Power Electronic Systems annual seminar, Blacksburg, VA, Apr. 2002, pp. 346-353.

M.A. De Rooij, J.T. Strydom, J.D. Van Wyk, P. Beamer, Development of a 1MHz MOSFET gate-driver for integrated converters, IEEE Industry Applications Society (IAS) 37th annual Conference proceedings, Pittsburgh, PA, U.S.A., vol. 4, Oct. 13-18, 2002, pp. 2622-2629.

J.R. Long, Monolithic transformers for silicon RF IC design, Solid-State Circuits, IEEE Journal of, vol. 35, Issue 9, Sep. 2000, pp. 1368-1382.

* cited by examiner

PLANAR, HIGH VOLTAGE EMBEDDED TRANSFORMER FOR ANALOG AND DIGITAL DATA TRANSMISSION

BACKGROUND

This invention relates generally to air-core transformers, and more particularly, to a planar air-core transformer design to replace a traditional parallel resonant balun that is comprised of a co-axial inductor and capacitor that is used in receiver coils in magnetic resonance imaging (MRI) systems to isolate coil elements. The transformer structure provides enhanced isolation at a specific frequency that can be used to replace a traditional transformer or to reduce common mode currents when used in high frequency switching power electronic converters and thereby reducing EMI generation and subsequently filtering requirements.

FIG. 1 illustrates a traditional balun 10 for MRI receiver coils that can be used multiple times, depending upon the location of the corresponding coil cable bundle exiting the corresponding structure, relative to the receive coil element. Balun 10 includes a common mode inductor 12 connected to a co-axial cable 14 at each end. Balun 10 further includes a common mode capacitor 16 external to a copper shield 18 that surrounds and shields the common mode inductor 12. External copper shield 18 includes an end cap 20 at each end to fully encapsulate the common mode inductor 12 within its shielded environment. A hole (not shown) may be centered on one of the end caps to allow for a brass tuning screw in some embodiments. Traditional balun 10 is used to isolate coil elements in MRI system receiver coils.

Optical isolating devices are generally used to provide signal isolation in power converters such as that depicted in FIG. 2 that illustrates a transformer employed in a medium voltage power electronic converter. Compact transformers are used in rare instances, but are limited to medium voltage (<1500V) systems.

Ethernet transformers have been designed to provide common mode isolation with differential mode matching to ensure the best possible transmission of the data signals. FIG. 3 illustrates an equivalent circuit for one Ethernet transformer that is known in the art. These transformers are limited in the isolation voltage that they can provide.

It would be desirable to provide a transformer that lends itself for integration in printed circuits, e.g., flexible printed, PCB, etc., and that provides higher isolation than traditional signal transformers at a particular and useful frequency such that the transformer is suitable to replace a traditional parallel resonant balun that is comprised of a co-axial inductor and capacitor such as the one depicted in FIG. 1 or a simple transformer used for power supply isolation or data isolation in high frequency switching power electronic converters.

BRIEF DESCRIPTION

Briefly, in accordance with one embodiment, a transformer comprises:

a flex or printed circuit board comprising a substrate material having a desired permittivity; and at least one primary winding and at least one secondary winding, each winding integrated with a corresponding flex or printed circuit board layer such that one or more respective transformer parasitic elements and the substrate permittivity between the primary and secondary windings together are tuned to a desired parallel resonant frequency.

According to another embodiment, a transformer is integrated with a flex or printed circuit board such that one or more transformer parasitic elements and the flex or printed circuit board permittivity between corresponding transformer primary and secondary windings together are tuned to a desired parallel resonant frequency.

DRAWINGS

These and other features, aspects, and advantages of the present invention will become better understood when the following detailed description is read with reference to the accompanying drawing in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 4:
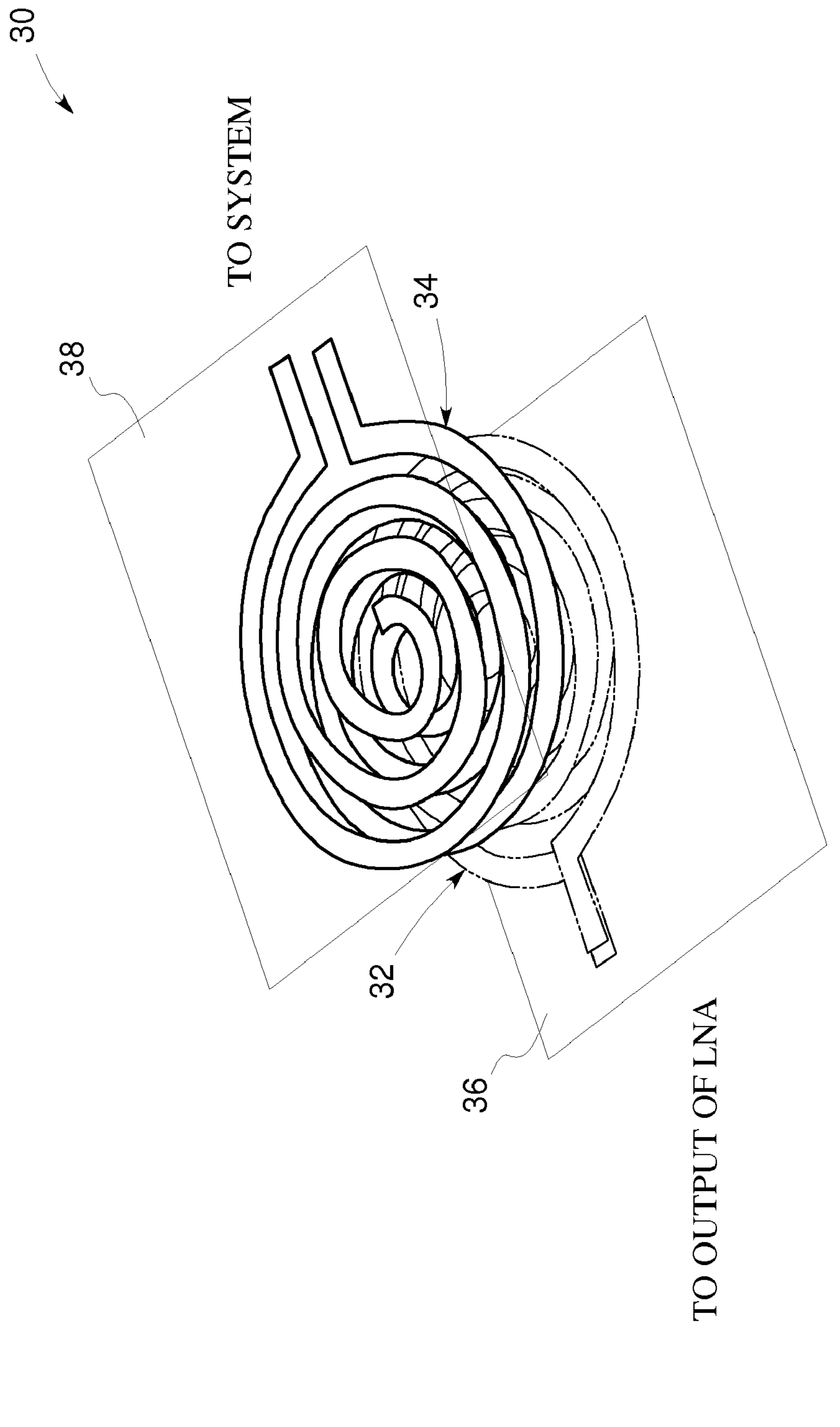
FIG. 4 is an exploded perspective view illustrating a transformer, according to one embodiment of the present invention.

FIG. 4 is an exploded perspective view illustrating a transformer 30, according to one embodiment of the present invention. Transformer 30 comprises a planar spiral primary winding 32 and a planar spiral secondary winding 34. The planar spiral windings 32, 34 are each integrated with a corresponding layer of a common multi-layer flexible circuit or printed circuit board. The multi-layer flexible circuit board may further include a primary side shield layer 36 and a secondary side shield layer 38. Transformer shield layers 36, 38 are located externally such that the primary and secondary windings 32, 34 can still couple magnetically. Planar spiral windings 32, 34 are positioned with a common central axis perpendicular to the planar surfaces of the planar spiral windings 32, 34 with respect to one another to provide differential mode signal transmission capabilities.

The air-core transformer design was recognized by the present inventors to provide advantages over traditional parallel resonant baluns that employ a co-axial inductor and capacitor such as those used in receiver coils in MRI systems to isolate coil elements by providing a broader frequency range of isolation between the primary and secondary with enhanced isolation at the tuned resonant frequency. It is important to note that the enhanced isolation at the resonant frequency does not increase the isolation withstand voltage but rather will increase the common mode impedance between the primary and secondary.

With continued reference to FIG. 4, each planar spiral winding 32, 34, is spirally wound about an axis that is substantially common to both windings 32, 34. Thus, the windings are concentric and have an increasing diameter. Further, each winding 32, 34 is planar such that the width of each winding 32, 34 in a direction parallel to the planar surface of the flex or printed circuit board is substantially greater than the height of each winding 32, 34 in a direction perpendicular to the planar surface of the flex or printed circuit board. According to one aspect, the windings are wound inwards on one layer and outwards on the next to ensure external connection to the windings 32, 34.

Figure 5:
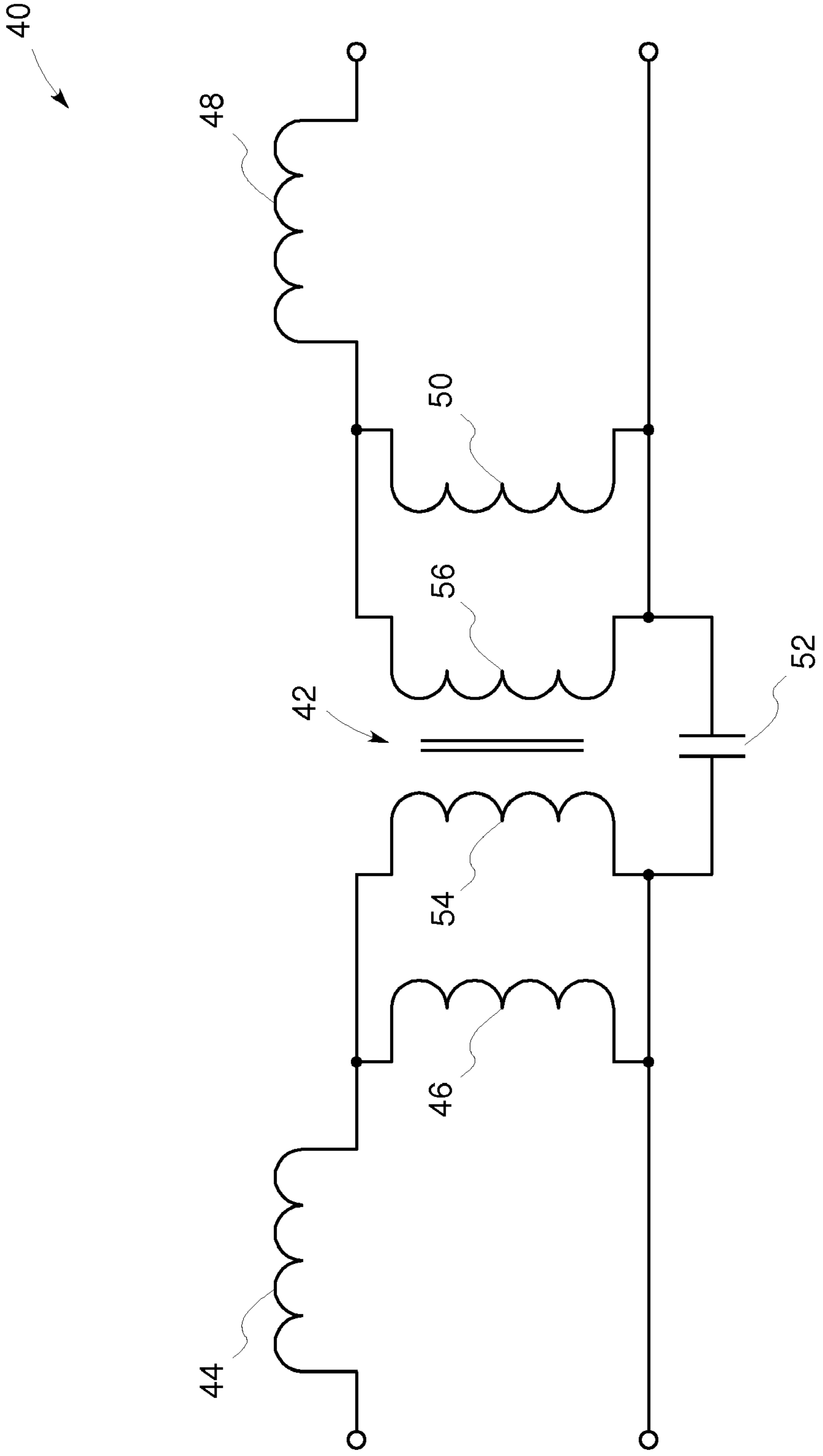
FIG. 5 is an equivalent circuit transformer electrical model for a conventional core transformer.

FIG. 5 is an equivalent circuit electrical model 40 for a conventional transformer. Equivalent circuit transformer electrical model 40 comprises a primary winding 54, a secondary winding 56, and inherent lumped circuit parasitic elements. These inherent lumped circuit parasitic elements include a primary leakage inductance 44, a primary magnetizing inductance 46, a secondary leakage inductance 48 and a secondary magnetizing inductance 50. Transformer electrical model 40 further includes a primary-secondary capacitance 52. Although not technically correct, a transformer core 42 is shown to clearly show the difference between inductances 44, 46, 48, 50 as the mutual coupling for the transformer.

Figure 6:
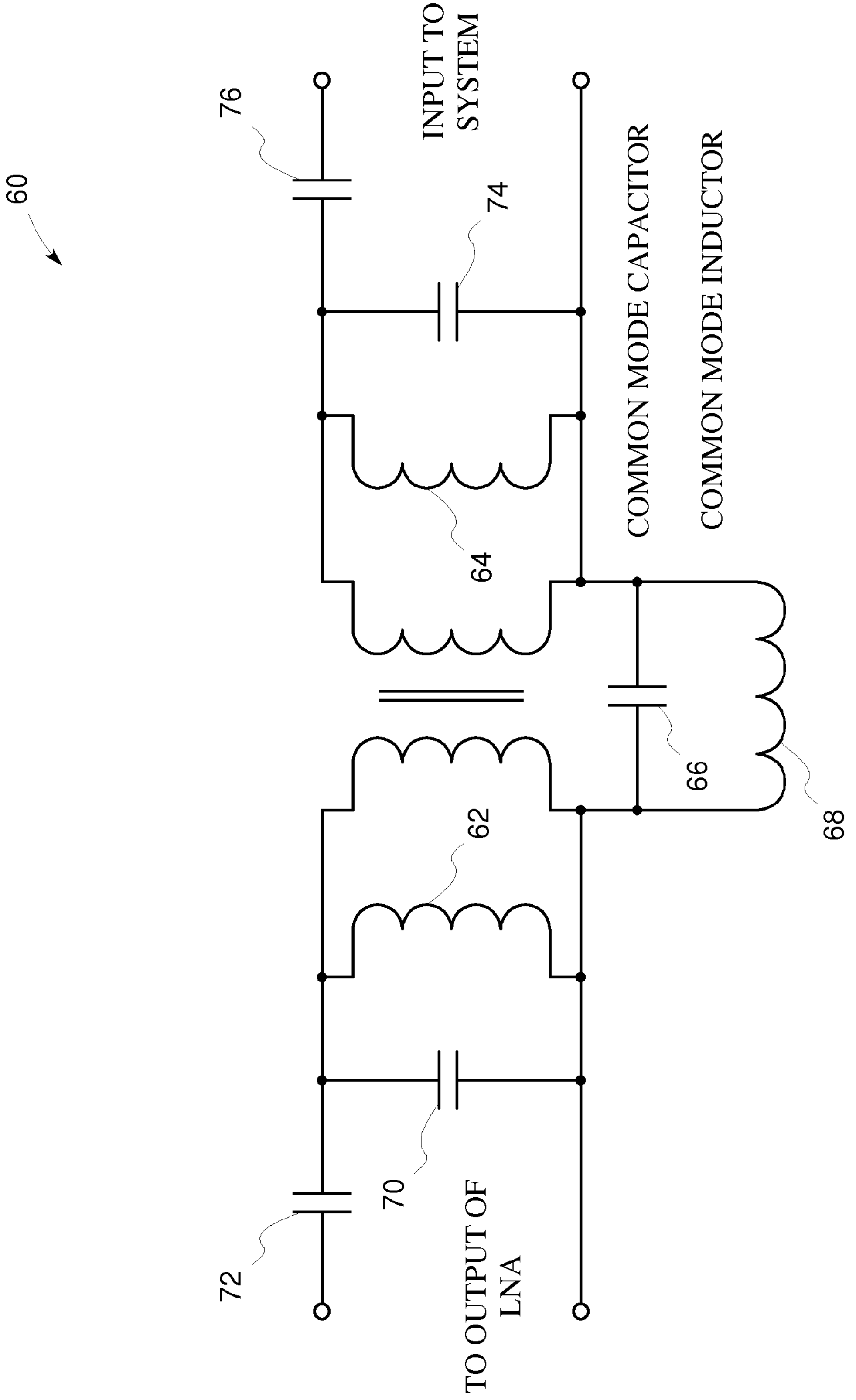
FIG. 6 illustrates an air-core signal isolation transformer electrical model for the transformer depicted in FIG. 4.

FIG. 6 illustrates an air-core signal isolation transformer electrical model 60 for the transformer 30 depicted in FIG. 4. Similar to equivalent circuit electrical model 40 depicted in FIG. 5, air-core signal isolation transformer model 60 comprises inherent lumped circuit parasitic elements including primary magnetizing inductance 62, secondary magnetizing inductance 64, primary-secondary (common mode) capacitance 66, and primary-secondary (common mode) inductance 68. A transformer core is again shown only to clearly show the difference between inductances 62, 64 and the mutual coupling effect of the transformer.

Figure 2:
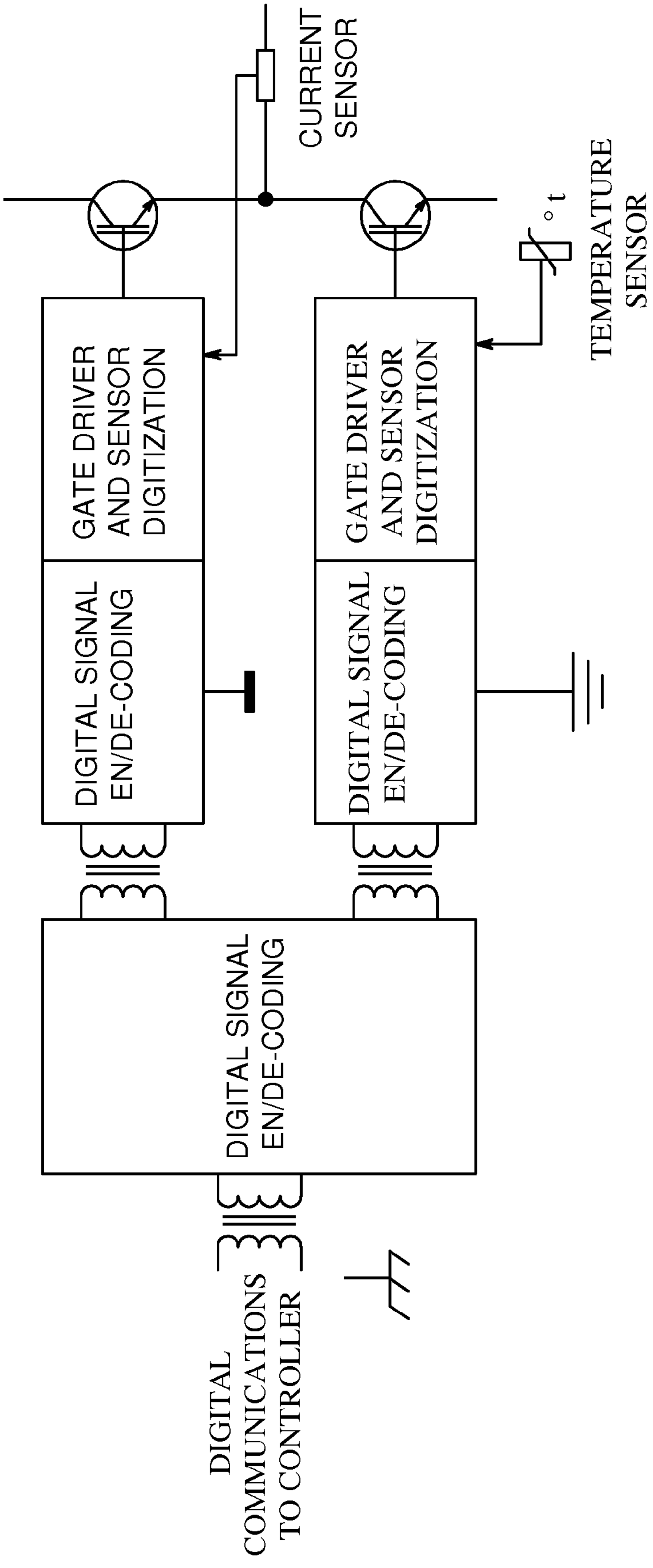
FIG. 2 illustrates a transformer balun employed in a medium voltage power electronic converter for signal or power isolation from one potential to another.
Figure 3:
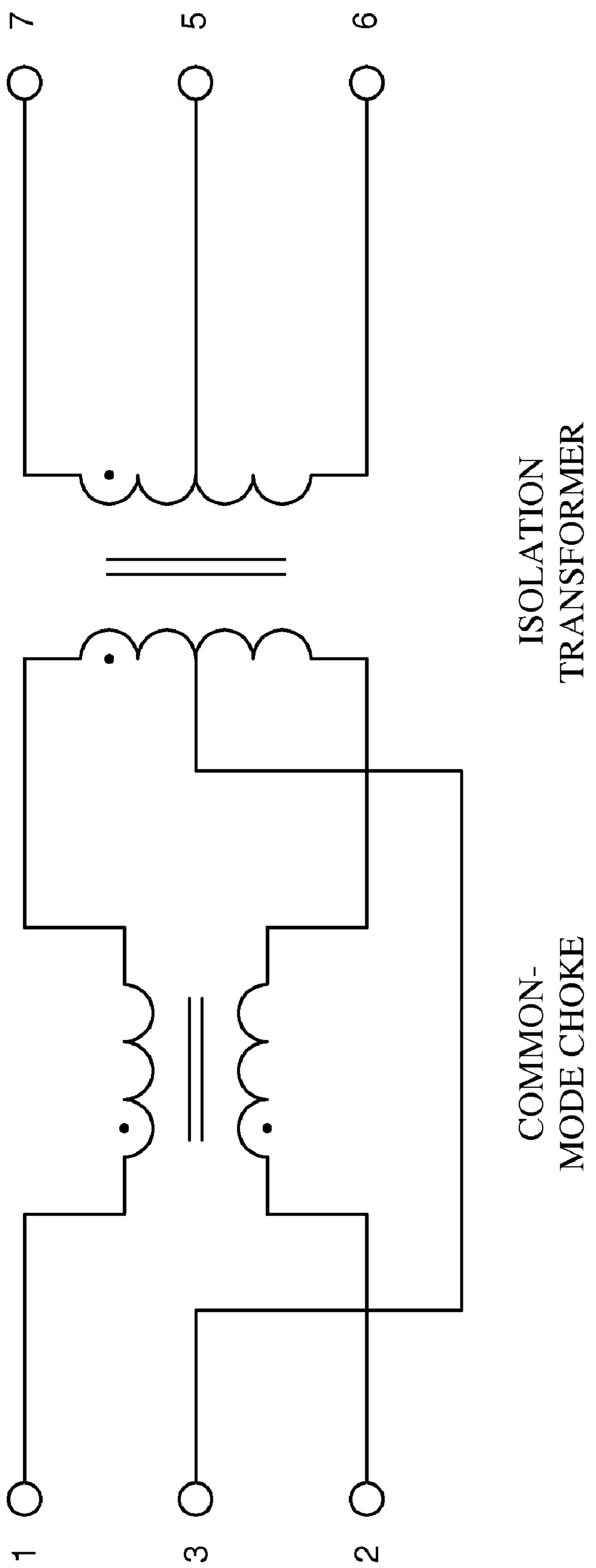
FIG. 3 illustrates an equivalent circuit for one Ethernet transformer that is known in the art.

Transformer 30 can be used to enhance data transmission for both analog and digital signals. Applications may include, without limitation, use in medium voltage power electronic circuits such as shown in FIG. 2, where digital communications are required for gating transmission and digital sensor signals, and where very high voltages and high transient voltages are imposed on the transformer. In such cases, the dominant digital data frequency is used to tune the differential mode parameters; and the dominant Fourier component of the switching transition is used to tune the common mode parameters. The tuned common mode impedance helps reduce the generation and propagation of common mode currents in power circuits. The transformer 30 can use both common mode and differential mode or either of the tuned parameter features. MRI signals and digital signals will, for example, benefit from both, whereas power supplies may only benefit from tuning the common mode parameters.

According to one aspect, the inherent lumped circuit parasitic elements 62, 64 are tuned to match the frequency of data transmission and to further enhance the isolation between the primary and secondary transformer windings by tuning the transformer elements 66, 68 to a specific frequency of interest such as the imaging frequency of a respective MRI system. External tuning capacitors 70, 72, 74, 76 are added to the inherent lumped circuit parasitic elements 62, 64, 66, 68 as shown in FIG. 6 such that together, the external tuning capacitors 70-76 and the inherent lumped circuit parasitic elements 62-68 can be tuned to a desired working frequency and/or a tuned impedance. The present invention is not so limited however, and it is noted that tuning can also be implemented through the use of embedded passive tuning elements, printed passive tuning elements, and the like, including without limitation, one or more tuning capacitors.

Figure 7:
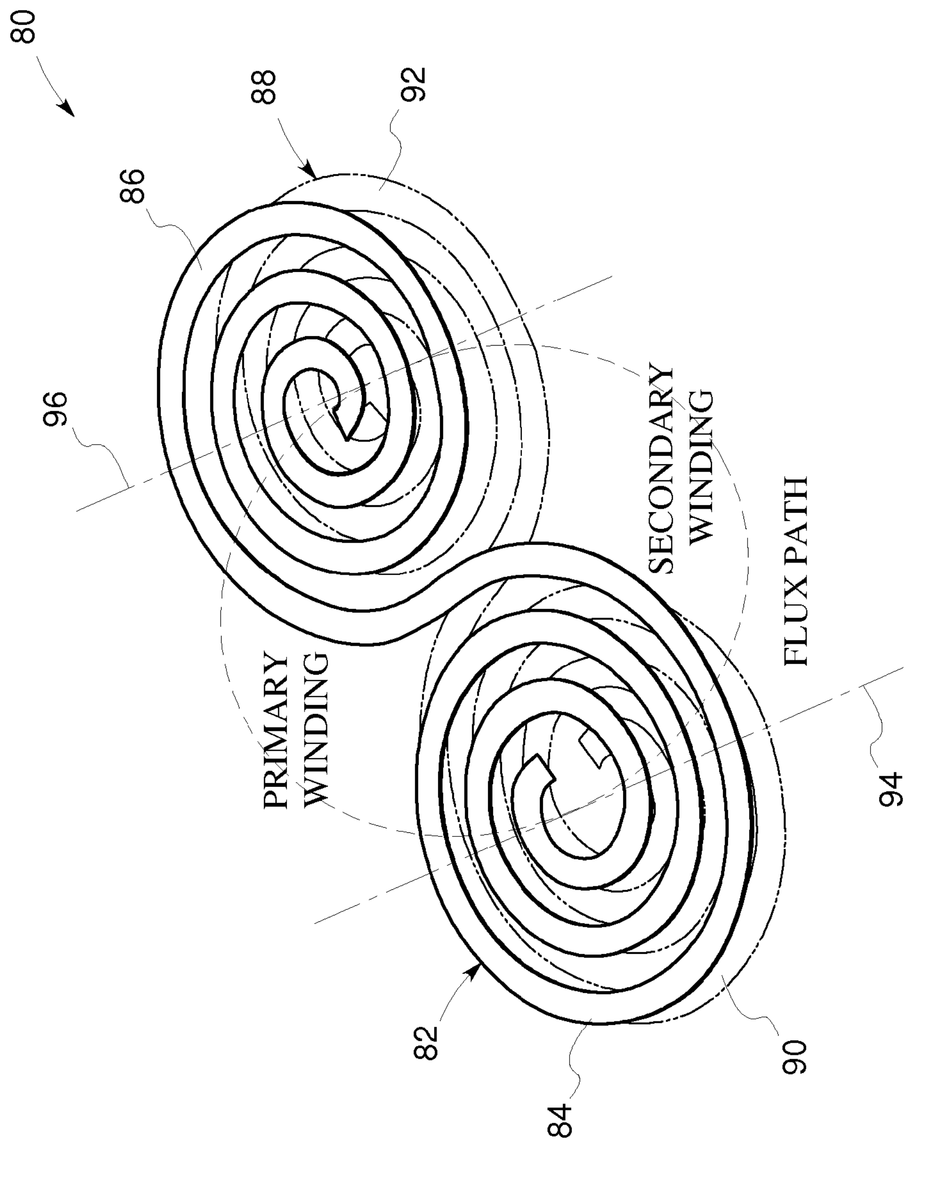
FIG. 7 illustrates an external H-field immune transformer winding, according to one embodiment of the present invention.

FIG. 7 illustrates an external H-field immune transformer winding 80, according to one embodiment of the present invention. Transformer winding 80 allows improved signal integrity by providing greater immunity to external magnetic fields that could corrupt data. The structure lends itself for integration in printed circuit boards. According to one aspect, this alternating coil arrangement may be replicated over larger larger areas to further improve H-field insensitivity. The windings shown in FIG. 7 could be repeated, for example, in a square pattern such that the nearest neighbors of each coil are coils that are oppositely wound.

Transformer winding 80 can be seen to include a dual planar primary spiral winding 82 and a dual planar secondary spiral winding 84. Dual planar primary spiral winding 82 comprises a first planar primary spiral winding 84 and a second planar primary spiral winding 86. Dual planar secondary spiral winding 88 comprises a first planar secondary spiral winding 90 and a second planar secondary spiral winding 92. Each planar primary spiral winding 84, 86 shares a common winding axis with a corresponding planar secondary winding 90, 92. Planar primary spiral winding 84, for example, shares winding axis with planar secondary spiral winding 90; while planar primary spiral winding 86 shares winding axis with planar secondary spiral winding 92.

Planar, high isolation voltage embedded transformers 30, 80 advantageously provide for improved manufacturability over traditional balun structures, while simultaneously providing a planar structure having reduced volume. The corresponding planar balun 30, 80 structures are suitable for use with commercial flex or printed circuit board technology and printed circuit processes. Other advantages include a reduction in balun tuning and test times. Device costs are reduced over traditional structures due to reduced component count requirements and embedded structure capabilities. The planar structure embodiments allow more consistent performance and are more stable than traditional balun structures. The planar structure embodiments further allow for easy isolation of a whole range of frequencies including DC with enhanced isolation at a selected frequency and provide enhanced data transmission due to matching impedance of transformer parameters to differential mode transmission impedance.

In summary explanation, a transformer structure comprises at least one planar spiral primary transformer winding integrated with a first layer of a flex or printed circuit board and at least one planar spiral secondary transformer winding integrated with a second layer of the flex or printed circuit board. A desired signal can be decoupled using the resultant transformer/balun in contradistinction with a traditional design that ensures direct coupling of the signal to the system. The parasitic parameters of the transformer are utilized to enhance the performance of the design and to ensure desired signal integrity.

The profile of the transformer or balun is dependent on ancillary components or the overall design. According to one aspect, the transformer is, basically, embedded or co-planar with the PCB, etc. so it achieves the lowest possible profile. The resultant structure provides several advantages over traditional parallel resonant baluns that employ a co-axial inductor and capacitor such as those used in receiver coils in MRI systems to isolate coil elements. These advantages include, without limitation, 1) low profile transformer/balun, 2) wide band isolation voltage, 3) enhanced common-mode isolation at selectable/tunable frequency by tuning the parasitic elements of the transformer(s) equivalent lumped circuit model (s), 4) integration with flex or printed circuit board technology, 5) shielding can be provided to prevent cross communications with other balun(s) or signal(s) in close proximity, 6) can be used in very high dv/dt environments such as gate drivers, 7) an external capacitor (or fixed or tunable embedded passive) can be placed across the primary-secondary common terminals to enhance the tenability of the parallel resonant frequency, 8) overlap between primary and secondary windings can be used to program a desired parallel resonant frequency, 9 distance between primary and secondary windings can be used to program a desired parallel resonant frequency, 10) permittivity of the substrate between primary and secondary windings can be used to program a desired parallel resonant frequency, 11) conductors of the windings are patterned to enhance the quality factor (QF) of the magnetizing inductances, 12 figure and shape can be used to make the design highly immune to external magnetic field influences, and 13) no magnetic core is required for the transformer.

Figure 8:
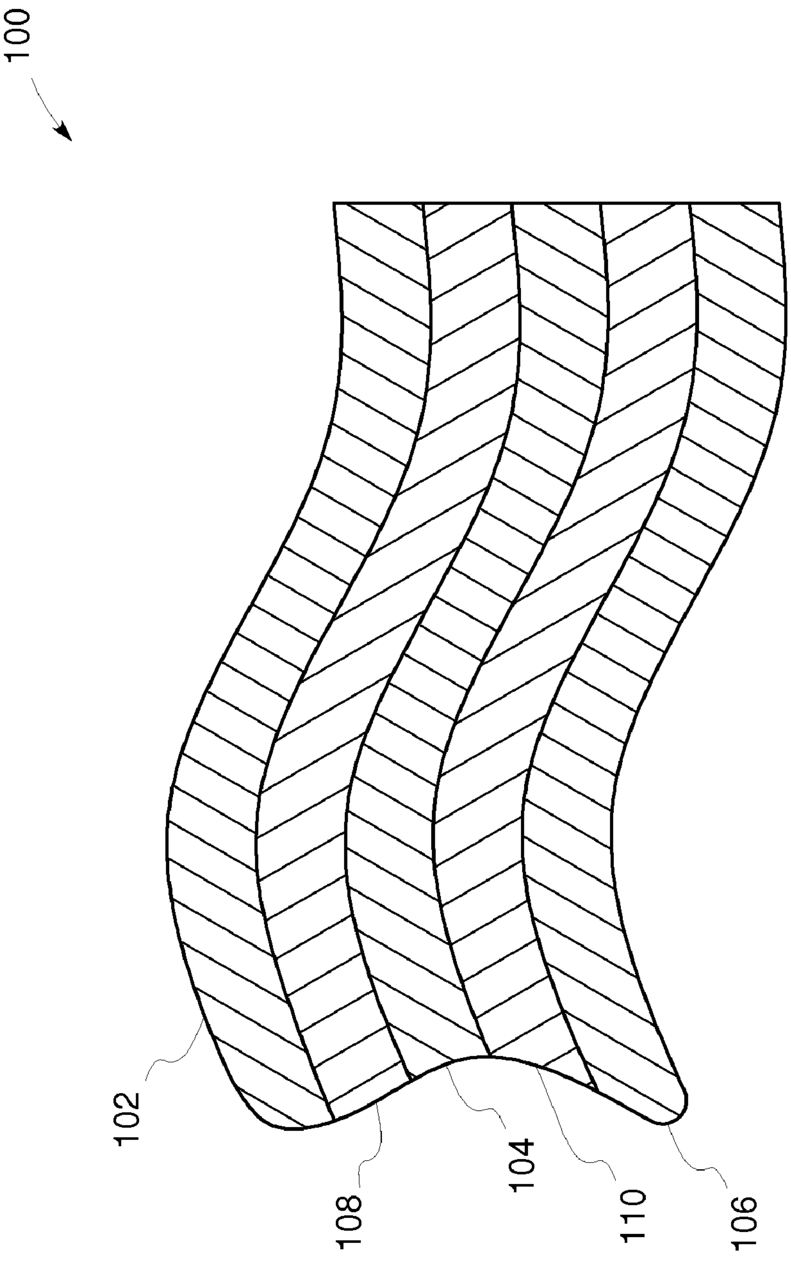
FIG. 8 illustrates a partial cross-sectional side view an air-core transformer embedded in a multi-layer flex circuit, according to one embodiment of the present invention.

Moving now to FIG. 8, a partial cross-sectional side view illustrates air-core transformer windings 108, 110 embedded in a multi-layer flex circuit 100, according to one embodiment of the present invention. Multi-layer flex circuit 100 includes a top layer 102, a primary winding layer 108, a middle layer 104, a secondary winding layer 100, and a bottom layer 106. The number of flex circuit layers is exemplary and may otherwise include any suitable number of layers depending on the particular application. Any one or more of flex circuit board layers 102, 104, 106 may be a shield layer configured to prevent cross coupling of communications with other balun (s) or signal(s) in close proximity to the primary and secondary transformer windings 108, 110.

Figure 9:
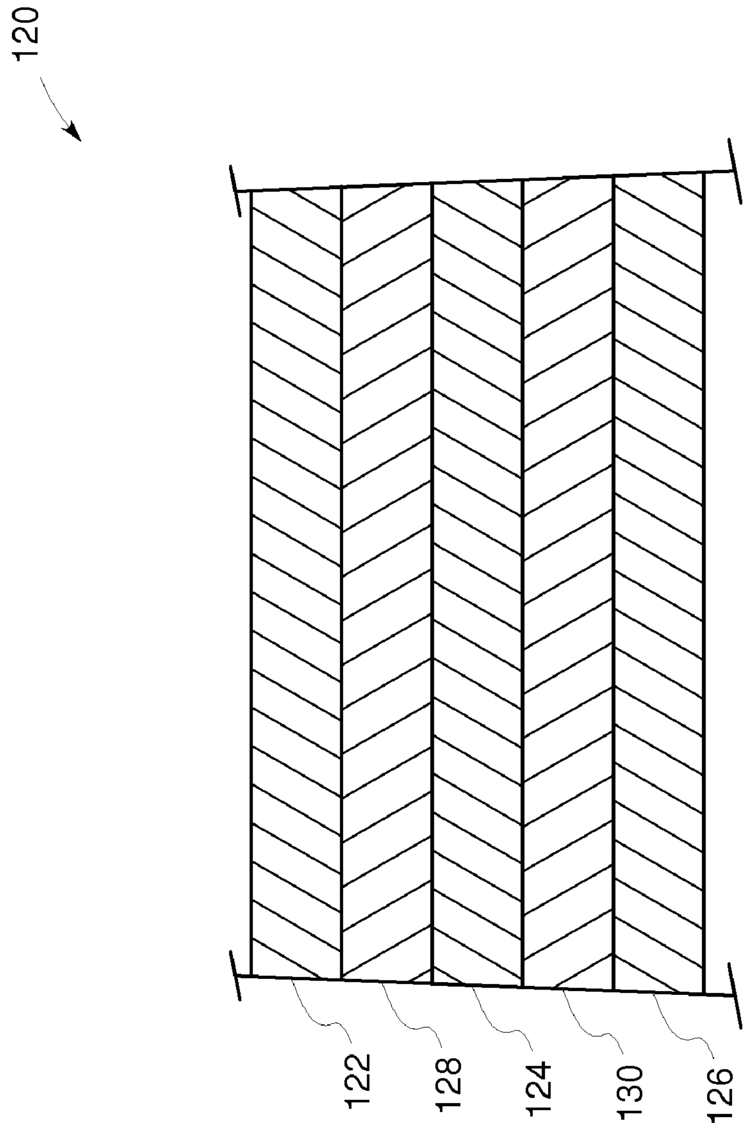
FIG. 9 is a partial cross-sectional side view illustrating an air-core transformer embedded in a multi-layer circuit board, according to one embodiment of the present invention.

FIG. 9 is a side cross-section view illustrating an air-core transformer 128, 130 embedded in a multi-layer circuit board 120, according to one embodiment of the present invention. Multi-layer flex circuit 120 includes a top layer 122, a primary winding layer 128, a middle layer 124, a secondary winding layer 130, and a bottom layer 126. Again, the number of circuit board layers is exemplary and may otherwise include any suitable number of layers depending on the particular application. Any one or more of circuit board layers 122, 124, 126 may be a shield layer configured to prevent cross coupling of communications with other balun(s) or signal(s) in close proximity to the primary and secondary transformer windings 128, 130. Although FIGS. 8 and 9 are described with reference to flexible and printed circuits, the present invention is not so limited, and it shall be understood that these are only illustrative of particular embodiments. Other embodiments may include circuit construction techniques including without limitation, photolithographic, printed/deposited/additive, transfer, punched, excised, and the like.

Figure 10:
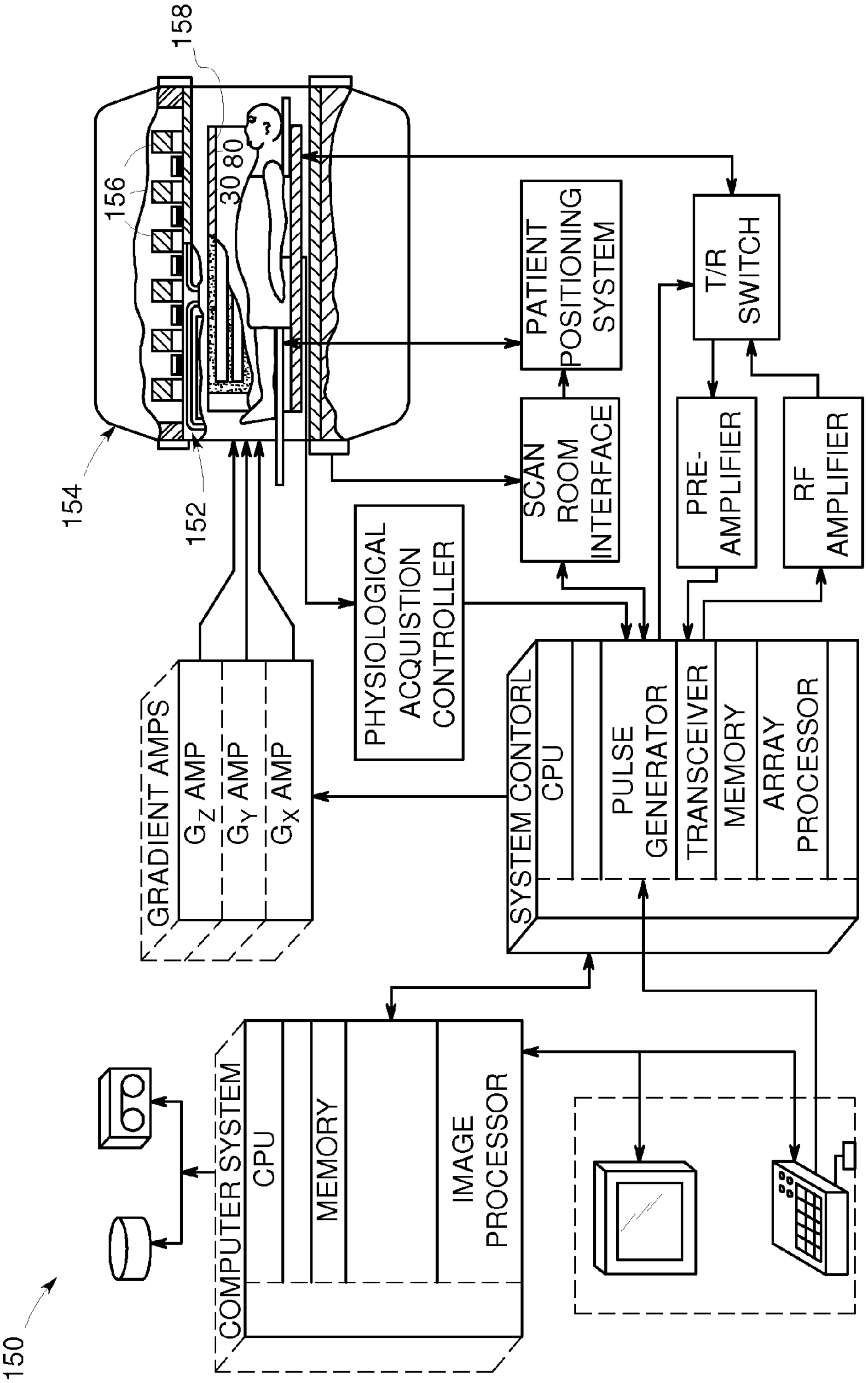
FIG. 10 illustrates an MR imaging system that employs an air-core transformer according to one embodiment of the present invention.

FIG. 10 illustrates an MR imaging system 150 that employs at least one air-core transformer 30, 80 according to one embodiment of the present invention. Each gradient amplifier excites a corresponding physical gradient coil in a gradient coil assembly 152 to produce magnetic field gradients used for spatially encoding acquired signals. The gradient coil assembly 152 forms part of a magnet assembly 143 which includes a polarizing magnet 156 and a whole-body RF coil assembly 158 configured to sense signals emitted by excited nuclei in a patient. RF coil assembly 158 employs one or more air-core transformers 30, 80 to replace the traditional parallel resonant balun(s) used in RF coil assembly 158 to isolate designated coil elements.

Figure 11:
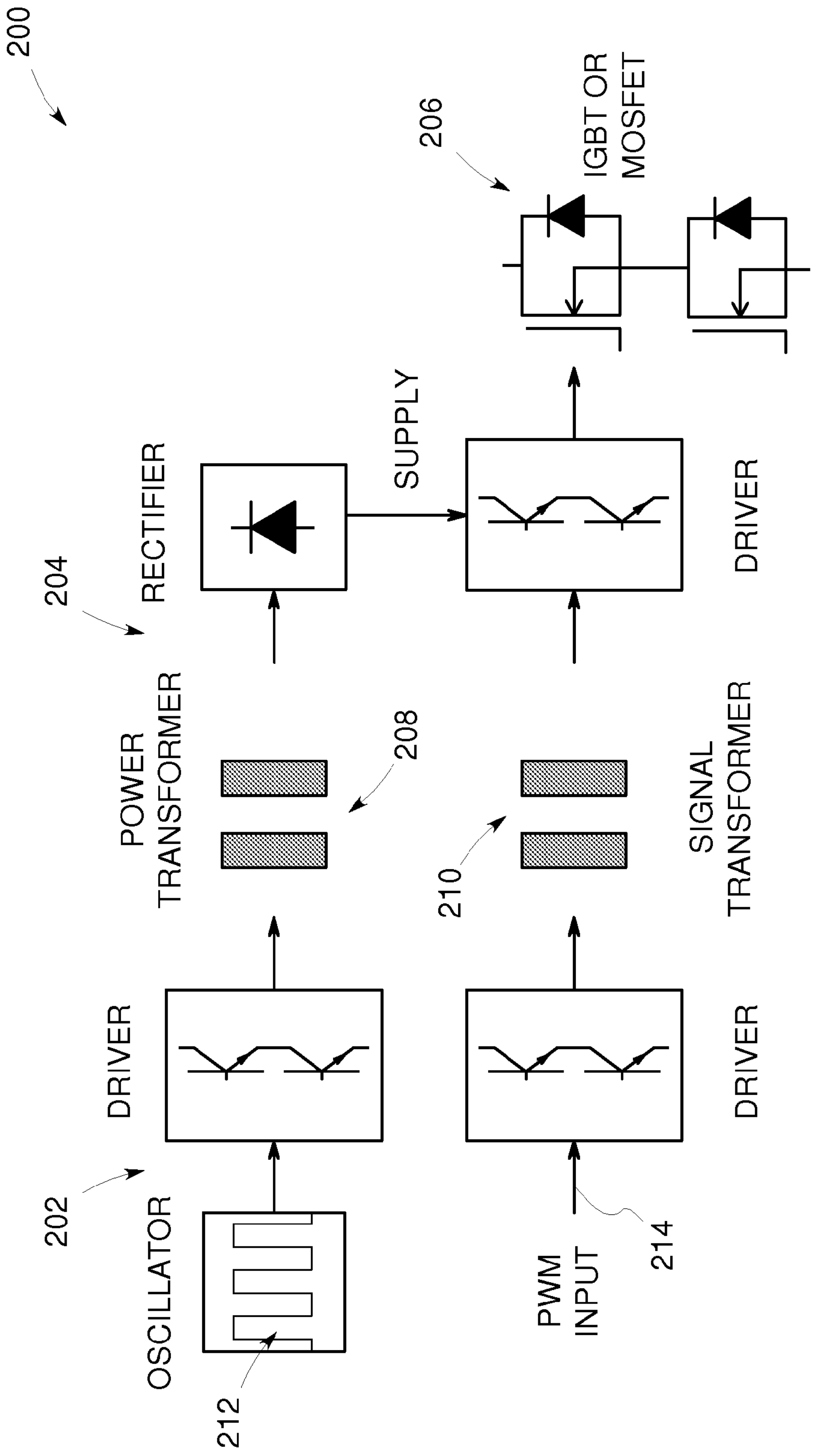
FIG. 11 is a simplified block diagram illustrating a high isolation voltage embedded transformer applied to a gate driver circuit for low and medium voltage devices, such as IGBTs and MOSFETs, and performs the functions of signal and power isolation according to one embodiment of the invention.

FIG. 11 is a simplified block diagram 200 illustrating a high isolation voltage embedded transformer applied as signal and power isolation means to a gate driver circuit for low and medium voltage devices, such as IGBTs and MOSFETs 206. These types of devices typically switch between 1 and 20 kV/μs, and any capacitance between the primary and secondary circuits 202, 204 will have a corresponding current flowing through it during the switching transitions. In this application power and signal isolation is provided by separate transformers 208, 210. Both these transformers 208, 210 have a common-mode tuned frequency that is set to the same frequency since they will both be exposed to the same switching conditions. The differential tuning of the power supply transformer 208 will match the power supply's switching frequency 212. The differential tuning of the signal transformer 210 will match the gating signal (PWM) 214 main frequency component. The design of these transformers 208, 210 can be identical or different and depends on the power requirements and data through put.

Figure 1:
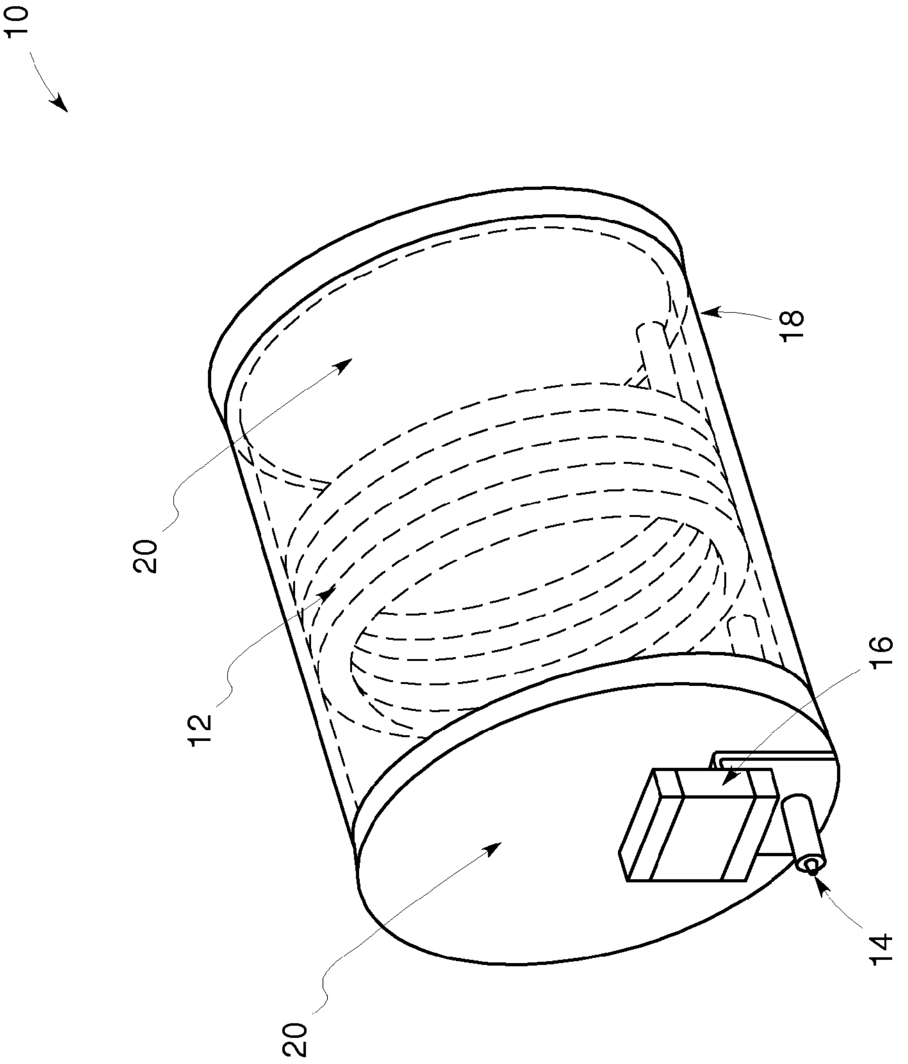
FIG. 1 (PRIOR ART)
FIG. 1 illustrates a traditional balun for MRI receiver coils.
Figure 12:
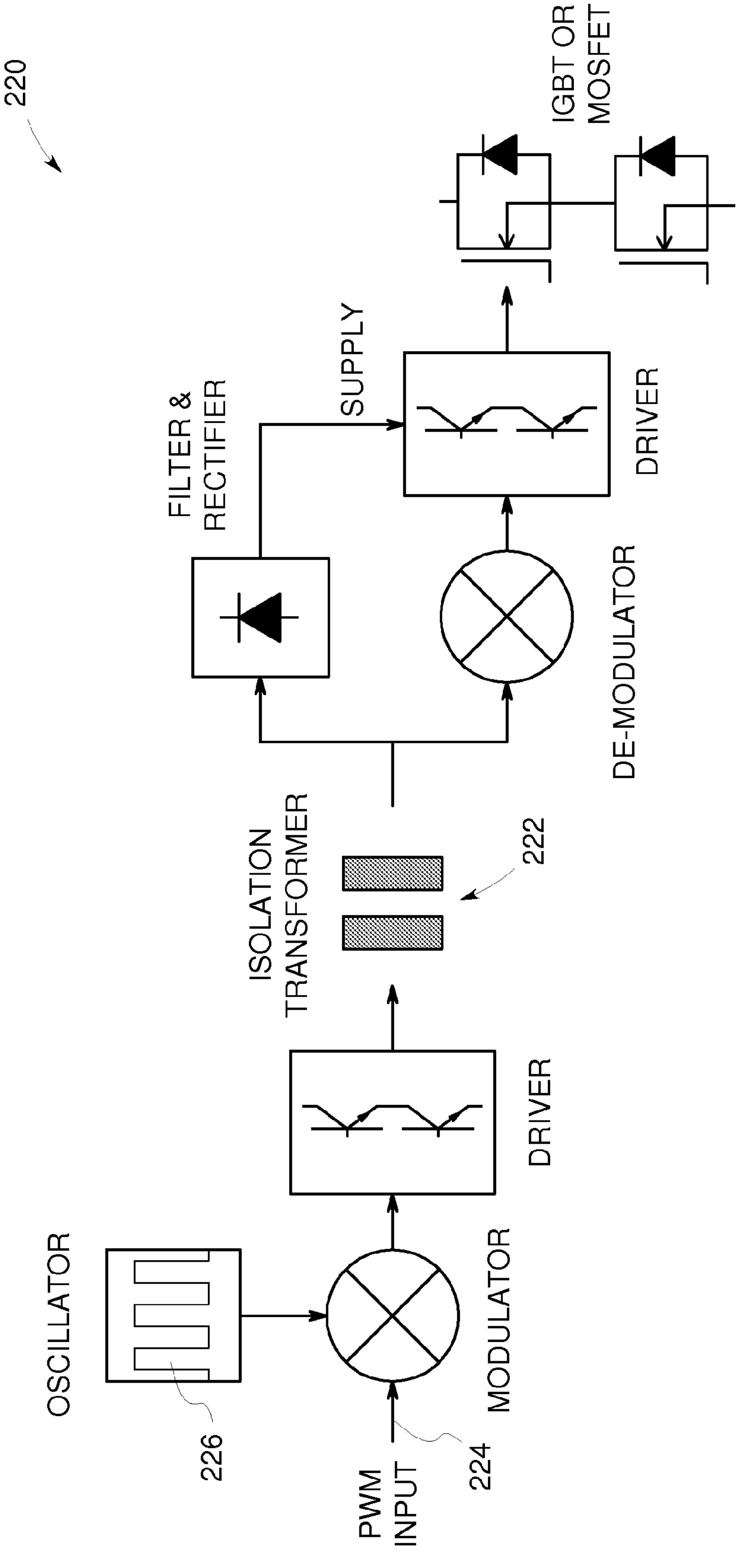
FIG. 12 is a simplified block diagram showing a similar application of the transformers depicted in FIG. 11 where the transformer functions have been combined into a single transformer, according to one embodiment of the invention.

FIG. 12 is a simplified block diagram 220 showing a similar application of the transformers 208, 210 depicted in FIG. 1 where the transformer functions have been combined into a single transformer 222. Single transformer 222 is used for both power and signal isolation. In this case, the common-mode isolation is tuned to the PWM switching frequency 224 and the differential mode parameters are tuned to the carrier frequency (power supply switching frequency (oscillator)) 226.

Figure 13:
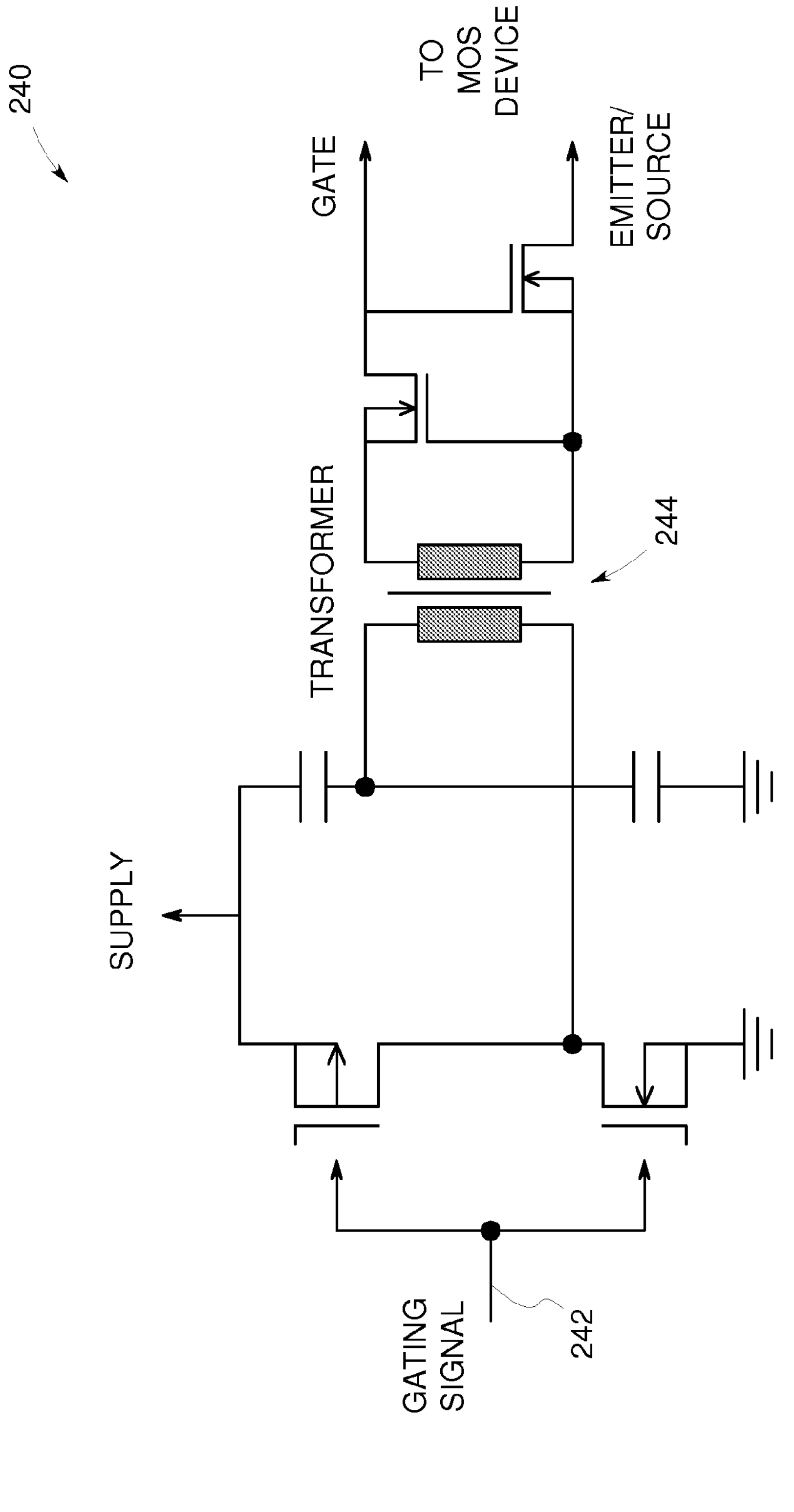
FIG. 13 is a schematic diagram depicting another variation of the transformer application shown in FIG. 12.

FIG. 13 is a schematic diagram 240 depicting another variation of the transformer application shown in FIG. 12. The power and signals are combined in this application without a carrier frequency. This application makes use of pulse signals 242 to drive the signal and power through a transformer 244, according to one embodiment of the present invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A transformer comprising:

a flex or printed circuit board comprising a substrate material having a desired permittivity; and at least one primary winding and at least one secondary winding, each winding integrated with a corresponding flex or printed circuit board layer such that one or more respective transformer parasitic elements and the substrate permittivity between the primary and secondary windings together are tuned to a desired parallel resonant frequency, wherein the parasitic elements comprise a common mode capacitance between the primary and secondary windings, and further comprise a common mode inductance between the primary and secondary windings, and further wherein the common mode capacitance and the common mode inductance are together tuned to increase a common mode impedance.

2. The transformer according to claim 1, wherein one or more respective transformer parasitic elements are further tuned to a desired parallel resonant frequency based on the axial separation between the primary and secondary windings.

3. The transformer according to claim 1, wherein the transformer is configured as a magnetic resonance imaging (MRI) system radio frequency (RF) coil assembly transformer.

4. The transformer according to claim 1, wherein the primary and secondary windings together form a planar air-core transformer.

5. The transformer according to claim 1, wherein at least one primary winding and at least one secondary winding are configured with a desired overlap, wherein one or more respective transformer parasitic elements are tuned to a desired parallel resonant frequency based on the desired overlap.

6. The transformer according to claim 1, wherein the transformer is a power supply transformer.

7. A transformer comprising:

a flex or printed circuit board comprising a substrate material having a desired permittivity; and at least one primary winding and at least one secondary winding, each winding integrated with a corresponding flex or printed circuit board layer such that one or more respective transformer parasitic elements and the substrate permittivity between the primary and secondary windings together are tuned to a desired parallel resonant frequency, wherein the parasitic elements comprise:

a common mode capacitance between the primary and secondary windings; and a common mode inductance between the primary and secondary windings, wherein the common mode capacitance and the common mode inductance are together tuned in response to the dominant Fourier component of a switching transition.

8. The transformer according to claim 7, wherein the transformer is a signal transformer.

9. The transformer according to claim 7, wherein one or more respective transformer parasitic elements are further tuned to a desired parallel resonant frequency based on the axial separation between the primary and secondary windings.

10. The transformer according to claim 7, wherein the transformer is configured as a magnetic resonance imaging (MRI) system radio frequency (RF) coil assembly transformer.

11. The transformer according to claim 7, wherein the primary and secondary windings together form a planar air-core transformer.

12. The transformer according to claim 7, wherein at least one primary winding and at least one secondary winding are configured with a desired overlap, wherein one or more respective transformer parasitic elements are tuned to a desired parallel resonant frequency based on the desired overlap.

13. The transformer according to claim 7, wherein the transformer is a power supply transformer.

14. A transformer comprising:

a flex or printed circuit board comprising a substrate material having a desired permittivity; and at least one primary winding and at least one secondary winding, each winding integrated with a corresponding flex or printed circuit board layer such that one or more respective transformer parasitic elements and the substrate permittivity between the primary and secondary windings together tuned to a desired parallel resonant frequency, wherein the parasitic elements comprise:

a common mode capacitance between the primary and secondary windings;

a common mode inductance between the primary and secondary windings;

a primary winding differential mode inductance; and a secondary winding differential mode inductance, wherein the primary winding differential mode inductance and the secondary winding differential mode inductance are together tuned in response to a dominant digital data frequency, and further wherein the common mode capacitance and the common mode inductance are together tuned in response to the dominant Fourier component of a switching transition.

15. The transformer according to claim 14, wherein the transformer is a signal transformer.

16. The transformer according to claim 14, wherein one or more respective transformer parasitic elements are further tuned to a desired parallel resonant frequency based on the axial separation between the primary and secondary windings.

17. The transformer according to claim 14, wherein the transformer is configured as a magnetic resonance imaging (MRI) system radio frequency (RF) coil assembly transformer.

18. The transformer according to claim 14, wherein the primary and secondary windings together form a planar air-core transformer.

19. The transformer according to claim 14, wherein at least one primary winding and at least one secondary winding are configured with a desired overlap, wherein one or more respective transformer parasitic elements are tuned to a desired parallel resonant frequency based on the desired overlap.

20. The transformer according to claim 14, wherein the transformer is a power supply transformer.

* * * * *